Figure 1:
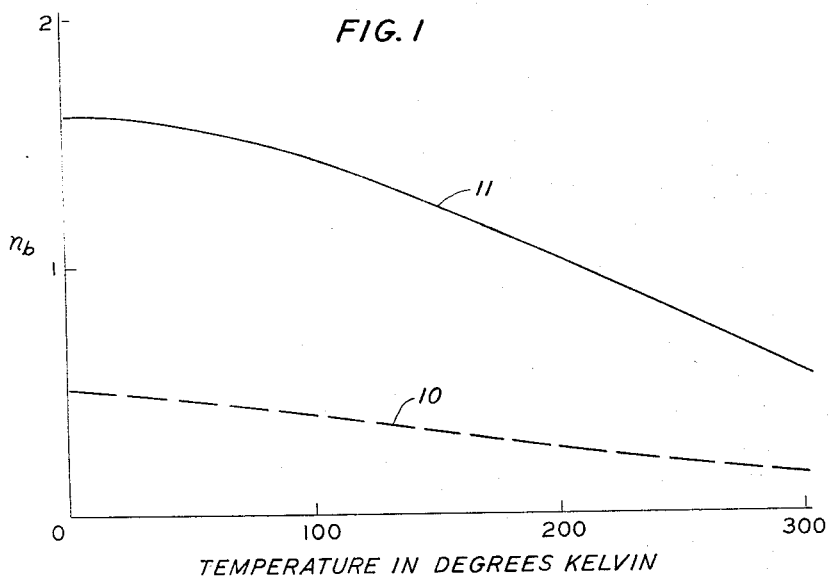

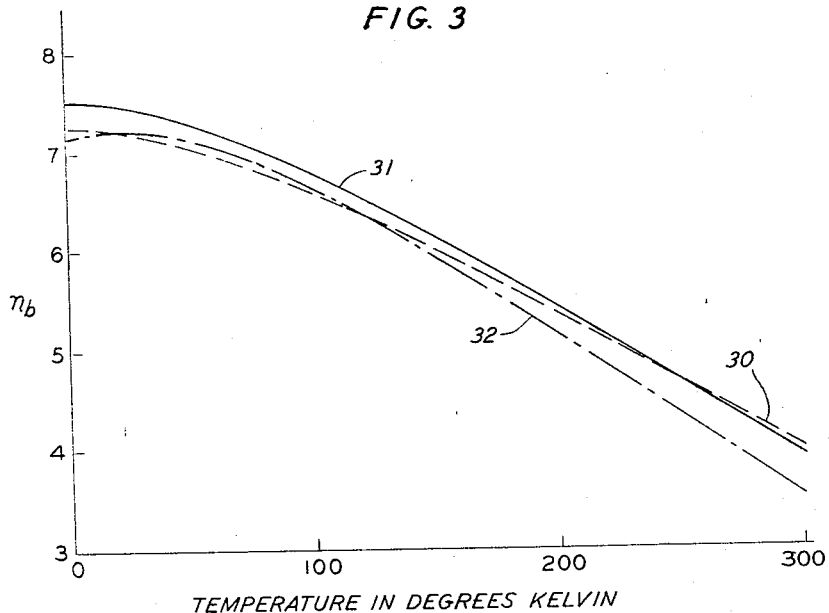
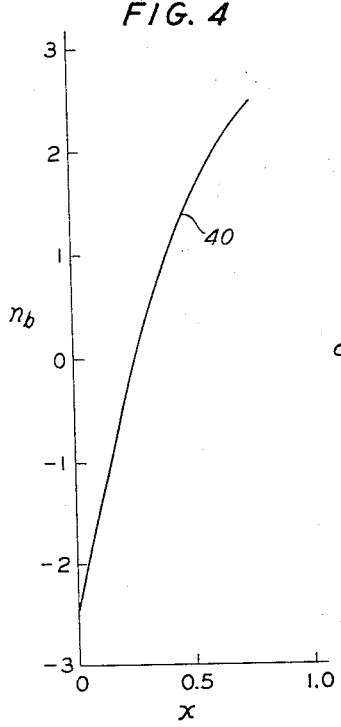
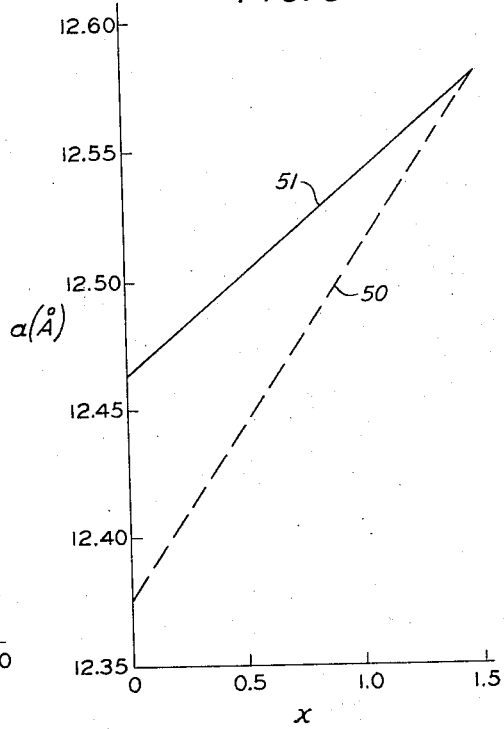

United States Patent Office 3,291,740
Patented Dec. 13, 1966

3,291,740
FERRIMAGNETIC GARNET COMPOSITIONS
Gerald P. Espinosa, Summit, and Seymour Geller, Morristown, N.J., assignors to Bell Telephone Laboratories, Incorporated, New York, N.Y., a corporation of New York
Filed Nov. 29, 1963, Ser. No. 326,675
7 Claims. (Cl. 252—62.5)

This invention relates to synthetic garnets and their preparation.

The discovery of synthetic garnets, and in particular yttrium iron garnet, has provoked new interest in the field of ferrimagnetic materials and has resulted in more useful and effective devices, particularly those employed for microwave communications. The garnet materials, aside from possessing exceptional ferrimagnetic properties, do not tolerate distortions in symmetry and generally form only according to precise stoichiometry. This property permits a degree of reproducibility in the synthesis of these materials which is notably lacking in the synthesis of spinel ferrites.

Since this discovery there have been several attempts toward substitutional modifications of yttrium iron garnet in an effort to discover enhanced or new characteristics. As a result the art has developed, characteristically by systematic and empirical methods, a catalogue of various elements which will substitute into the garnet structure. Certain of the substituted garnets have useful and unexpected properties such as those described and claimed in United States Patents 3,006,854 and 3,006,855, both issued October 31, 1961, and United States Patent 3,156,-651, issued November 10, 1964, and applications Serial Nos. 293,962 and 293,963, both filed July 10, 1963.

In the garnet compositions there is a strong interaction between the octahedrally and tetrahedrally situated iron ions. It is found that the magnetic moments of magnetic ions occupying these sites oppose one another. Thus the over-all moment of a ferrimagnetic garnet such as yttrium iron garnet is attributed to the numerical prevalence of the three tetrahedrally located ferric ions over the two octahedral ions. Thus it becomes evident that a nonmagnetic substitution in the tetrahedral site initially reduces the moment of the garnet whereas octahedral substitutions initially increase the magnetic moment of the garnet. A garnet system illustrating this principle is described and claimed in the aforementioned application Serial No. 183,201.

This invention is directed to a novel garent system in which antimony is substituted for ion in the octahedral sites. Other aspects of the invention involve companion substitutions each of which results in a garnet material having useful and desirable ferrimagnetic properties. A more specific embodiment of the invention is a ferrimagnetic garnet composition containing antimony which is devoid of any rare earth ions. Rare earth elements are difficult and expensive to obtain in pure form. Hence garnets which include rare earth elements generally contain impurities which broaden the ferromagnetic resonance line width. The elimination of rare earth ions from the garnet not only results in enhanced ferrimagnetic properties but also effects a cost saving.

The ferrimagnetic garnet compositions within the scope of this invention are represented by the formula:

$$\{Me_{3-A}X_A\}[Fe_{2-B}Sb_B](Fe_{3-C}V_C)O_{12}$$

where Me is yttrium or bismuth, X is a divalent compensating ion such as calcium, and A, B and C are related and limited according to the following relationships:

$B+C=\frac{1}{2}A$
$A=0.1$ to 3
$B=0.05$ to 1.5 and
$C=0$ to 1.5

These and other aspects of the invention may be more easily understood when considered in the following detailed description. In the drawing:

FIG. 1 is a plot of spontaneous magnetization $n_b$ vs. temperature for the composition:

$$\{Ca_3\}[Sb_xFe_{2-x}](Fe_{1.5+x}V_{1.5-x})O_{12}$$

Figure 2:
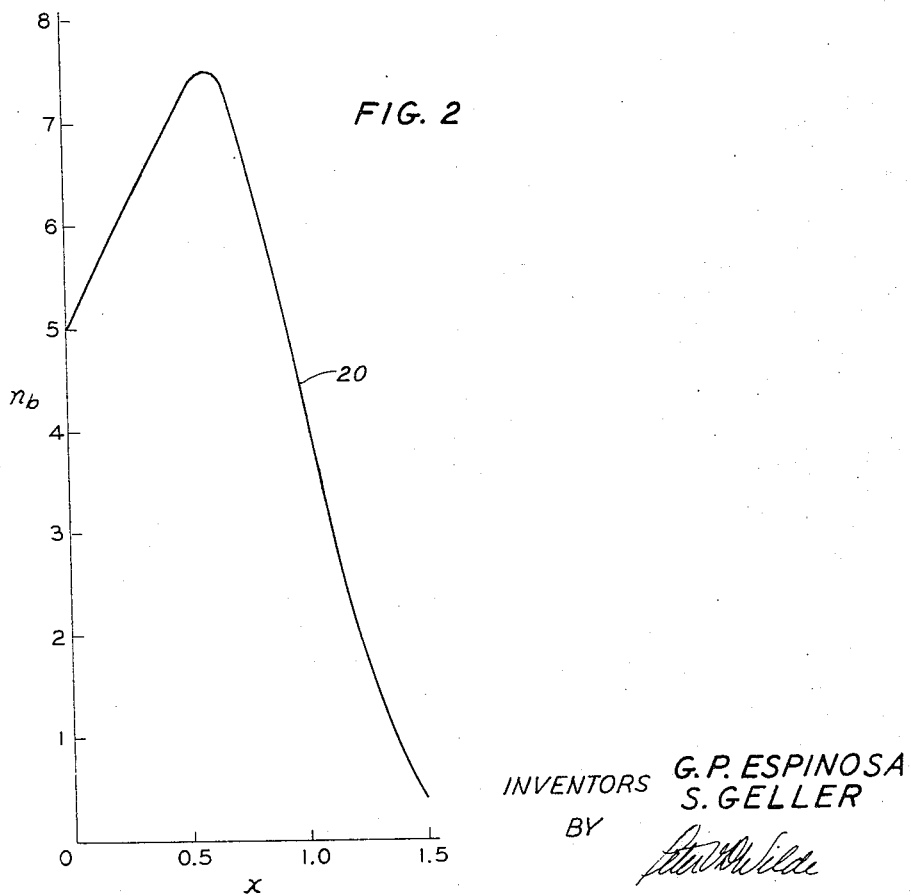

FIG. 2 is a plot of spontaneous magnetization $n_b$ vs. composition for compounds represented by the general formula:

$$\{Y_{3-2x}Ca_{2x}\}[Sb_xFe_{2-x}](Fe_3)O_{12}$$

FIG. 3 is a plot of spontaneous magnetization $n_b$ vs. temperature for various compositions of the formula:

$$\{Y_{3-2x}Ca_{2x}\}[Sb_xFe_{2-x}](Fe_3)O_{12}$$

FIG. 4 is a plot of spontaneous magnetization $n_b$ vs. composition for various materials of the formula:

$$\{Ca_3\}[Sb_xFe_{2-x}](Fe_{1.5+x}V_{1.5-x})O_{12}$$

and

FIG. 5 is a plot of the lattice constant, $a$, vs. composition for the compositions:

$$\{Ca_3\}[Sb_xFe_{2-x}](Fe_{1.5+x}V_{1.5-x})O_{12}$$
$$\{Y_{3-2x}Ca_{2x}\}[Sb_xFe_{2-x}](Fe_3)O_{12}$$

Referring to FIG. 1 there is shown the variation of spontaneous magnetization $n_b$ in Bohr magnetons per formula weight with temperature in degrees Kelvin. Curve 10 is for the composition $$\{Ca_3\}[Sb_{0.3}Fe_{1.7}](Fe_{1.8}V_{1.2})O_{12}$$

and curve 11 shows the relationship for the material:

$$\{Ca_3\}[Sb_{0.5}Fe_{1.5}](Fe_2V)O_{12}$$

FIG. 2 is a plot of magnetization $n_b$ again in Bohr Magnetons per formula unit vs. composition with curve 20 describing the moment for compositions of the general formula:

$$\{Y_{3-2x}Ca_{2x}\}[Sb_xFe_{2-x}](Fe_3)O_{12}$$

where $x$ is varied as the abscissa. The peak moment occurs at a value of $x=0.6$.

FIG. 3 is a plot of spontaneous magnetization $n_b$ vs. temperature similar to that of FIG. 1 for three compositions having the general formula:

$$\{Y_{3-2x}Ca_{2x}\}[Sb_xFe_{2-x}](Fe_3)O_{12}$$

Curves 30, 31 and 32 show this relationship for the compositions in which $x$ equals 0.5, 0.6 and 0.7, respectively.

FIG. 4 is a plot of spontaneous magnetization $n_b$ vs. composition for the garnet having the general formula:

$$\{Ca_3\}[Sb_xFe_{2-x}](Fe_{1.5+x}V_{1.5-x})O_{12}$$

where $x$ is plotted as abscissa. Note that in curve 40 the magnetic moment for this garnet passes through a zero value at $x=0.25$. In this composition it is seen that the number of octahedral iron ions is equal to the number of tetrahedral iron ions. Hence the zero magnetic moment is theoretically predicted.

FIG. 5 is a plot of the lattice constant in Angstroms, $a$, vs. composition for the series of composiitons having the general formulas:

$$\{Y_{3-2x}Ca_{2x}\}[Sb_xFe_{2-x}](Fe_3)O_{12} \text{ (curve 50)}$$

and $$\{Ca_3\}[Sb_xFe_{2-x}](Fe_{1.5+x}V_{1.5-x})O_{12} \text{ (curve 51)}$$

The lattice constants are useful in converting the spontaneous magnetization $n_b$, which is based on formula units to a weight or volume magnetization unit. One such calculation can be made according to the formula:

$$4\pi M = 4\pi n_b \times \frac{5585}{MW} \times \rho$$

where $4\pi M$ is the familiar measure of magnetization per unit volume of garnet, $n_b$ is the magnetization per formula unit, 5585 is the equivalent to the number of gauss/Bohr magneton, MW is the molecular weight and $\rho$ is the density. The lattice constant $a$ is necessary for the calculation of the density according to the relationship:

$$\rho = \frac{1.66 \times 8 \times MW}{V}$$

and $$V = a^3$$

where $\rho$ is the density, 1.66 is the reciprocal of Avagadro's number multipled by $10^{24}$, 8 is the number of formula units in the crystallographic unit cell, MW is the molecular weight, and V is the volume per formula unit in Angstroms$^3$.

Values of $4\pi M$ for exemplary compositions of the invention are given in the following table. The column $x$ prescribes the composition from the formula:

$$\{Y_{3-2x}Ca_{2x}\}[Sb_xFe_{2-x}](Fe_3)O_{12}$$

TABLE I

| $x$ | $v$ | $4\pi M$ (at 0° K.) gauss/cc. |
|---|---|---|
| 0.2 | 1,900 | 2,860 |
| 0.4 | 1,920 | 3,260 |
| 0.6 | 1,925 | 3,625 |
| 0.7 | 1,930 | 3,710 |

The samples used for these measurements were prepared according to the following examples.

Example I

The composition $$\{Y_2Ca\}[Sb_{0.5}Fe_{1.5}](Fe_3)O_{12}$$

was prepared from the following starting materials:

| | Grams |
|---|---|
| $Y_2O_3$ | 0.2258 |
| $CaCO_3$ | 0.1001 |
| $Sb_2O_3$ | 0.0729 |
| $Fe_2O_3$ | 0.3593 |

These materials were ground together in an agate mortar after which they were compacted in a steel die. The ground material was formed into a pellet which was calcined over a temperature range of 500° C. to 950° C. following a schedule such that the maximum temperature was attained in a period of about one hour.

The calcined pellet was then fired according to the schedule:

| | Hours |
|---|---|
| 1050° C. | ½ |
| 1350° C. | 23 |

Between the designated firing steps the mixture was reground. The regrinding procedure was used in every example described.

The resulting product in this and all the following examples was a single-phase garnet as determined by X-ray diffraction analysis.

Example II

The composition $$\{Y_{1.8}Ca_{1.2}\}[Sb_{0.6}Fe_{1.4}](Fe_3)O_{12}$$

was prepared from the following starting materials:

| | Grams |
|---|---|
| $Y_2O_3$ | 0.2032 |
| $CaCo_3$ | 0.1201 |
| $Sb_2O_3$ | 0.0875 |
| $Fe_2O_3$ | 0.3513 |

These materials were ground and calcined as in Example I. The calcined material was fired according to the conditions:

| | Hours |
|---|---|
| 1050° C. | ½ |
| 1325° C. | 18 |

Example III

The composition $$\{Y_{1.6}Ca_{1.4}\}[Sb_{0.7}Fe_{1.3}](Fe_3)O_{12}$$

was prepared by mixing together the following ingredients:

| | Grams |
|---|---|
| $Y_2O_3$ | 0.1807 |
| $CaCO_3$ | 0.1401 |
| $Sb_2O_3$ | 0.1020 |
| $Fe_2O_3$ | 0.3434 |

The mixture was ground, calcined as in Examples I and II, and fired under the following conditions:

| | Hours |
|---|---|
| 1100° C. | ½ |
| 1310° C. | 16 |

Example IV

The composition $$\{Y\ Ca_2\}[Sb\ Fe](Fe_3)O_{12}$$

was prepared from the materials:

| | Grams |
|---|---|
| $Y_2O_3$ | 0.1129 |
| $Ca_2O_3$ | 0.2002 |
| $Sb_2O_3$ | 0.1458 |
| $Fe_2O_3$ | 0.3194 |

The mixture was ground, calcined as before, and fired according to the schedule:

| | Hours |
|---|---|
| 1150° C. | ½ |
| 1210° C. | 16 |
| 1260° C. | 16 |
| 1320° C. | 64 |

Example V

The garnet composition $$\{Ca_3\}[Sb_{1.5}Fe_{0.5}](Fe_3)O_{12}$$

was prepared from the following ingredients:

| | Grams |
|---|---|
| $CaCO_3$ | 0.3003 |
| $Sb_2O_3$ | 0.2186 |
| $Fe_2O_3$ | 0.2795 |

The mixture was ground and calcined as in the previous examples and fired according to the schedule:

| | Hours |
|---|---|
| 1075° C. to 1050° C. | 2½ |
| 1125° C. | 2 |
| 1130° C. | 11 |

Example VI

The garnet composition $$\{Ca_3\}[Sb_{0.3}Fe_{1.7}](Fe_{1.8}V_{1.2})O_{12}$$

was prepared by mixing together the following ingredients:

| | Grams |
|---|---|
| $CaCO_3$ | 0.3003 |
| $Sb_2O_3$ | 0.0437 |
| $Fe_2O_3$ | 0.2795 |
| $V_2O_5$ | 0.1091 |

The mixture was ground and calcined as before and fired according to the schedule:

| | Hours |
|---|---|
| 1100° C. | ½ |
| 1160° C. | 16 |
| 1175° C. | 67 |

Example VII

The garnet composition $$\{Ca_3\}[Sb_{0.5}Fe_{1.5}](Fe_{2.0}V)O_{12}$$

was prepared by combining the following ingredients:

| | Grams |
|---|---|
| $CaCO_3$ | 0.3003 |
| $Sb_2O_3$ | 0.0729 |
| $Fe_2O_3$ | 0.2795 |
| $V_2O_5$ | 0.0910 |

The mixture was ground and calcined as in the previous examples and fired according to the schedule:

| | Hours |
|---|---|
| 1100° C. | ½ |
| 1215° C. | 42 |
| 1200° C. | 22 |

Example VIII

The garnet composition $$\{Ca_3\}[Sb_{0.75}Fe_{1.25}](Fe_{2.25}V_{0.75})O_{12}$$

was prepared by mixing together the following materials:

| | Grams |
|---|---|
| $CaCO_3$ | 0.3003 |
| $Sb_2O_3$ | 0.1093 |
| $Fe_2O_3$ | 0.2795 |
| $V_2O_5$ | 0.0682 |

The mixture was ground and calcined as previously prescribed and fired according to the schedule:

| | Hours |
|---|---|
| 1100° C. | ½ |
| 1130° C. | 16 |
| 1275° C. | 3 |
| 1300° C. | 2 |

Example IX

The garnet composition $$\{Y_{0.7}Ca_{2.3}\}[Sb_{0.575}Fe_{1.425}](Fe_{2.425}V_{0.575})O_{12}$$

was prepared by mixing together the following materials:

| | Grams |
|---|---|
| $Y_2O_3$ | 0.0790 |
| $CaCO_3$ | 0.2302 |
| $Sb_2O_3$ | 0.0838 |
| $Fe_2O_3$ | 0.3074 |
| $V_2O_5$ | 0.0523 |

The mixture was ground and calcined as in Example I and fired according to the schedule:

| | Hours |
|---|---|
| 1100° C. | 1 |
| 1200° C. | 16 |
| 1200° C. | 22 |
| 1255° C. | 64 |
| 1300° C. | 17 |

Example X

The garnet composition $$\{Bi_{0.7}Ca_{2.3}\}[Sb_{0.575}Fe_{1.425}](Fe_{2.425}V_{0.575})O_{12}$$

was prepared by combining the following materials:

| | Grams |
|---|---|
| $Bi_2O_3$ | 0.1631 |
| $CaCO_3$ | 0.2302 |
| $Sb_2O_3$ | 0.0838 |
| $Fe_2O_3$ | 0.3075 |
| $V_2O_5$ | 0.0523 |

The mixture was ground and calcined as prescribed earlier and fired according to the schedule:

| | Hours |
|---|---|
| 1020° C. | 1 |
| 1025° C. | 3 |
| 1035° C. | 24 |
| 1035° C. | 90 |
| 1040° C. | 50 |
| 1035° C. | 1 |

Example XI

The garnet composition $$\{Bi_{0.8}Ca_{2.2}\}[Sb_{0.55}Fe_{1.45}](Fe_{2.45}V_{0.55})O_{12}$$

was prepared by combining the following ingredients:

| | Grams |
|---|---|
| $Bi_2O_3$ | 0.1864 |
| $CaCO_3$ | 0.2202 |
| $Sb_2O_3$ | 0.0802 |
| $Fe_2O_3$ | 0.3195 |
| $V_2O_5$ | 0.0500 |

The mixture was ground and calcined as in Example I and fired according to the schedule:

| | Hours |
|---|---|
| 1000° C. | ½ |
| 1035° C. | 2 |
| 1020° C. | 15 |
| 1060° C. | 18 |
| 975° C. | 48 |

Various data obtained from these and other samples is given in the figures described previously.

Each of the examples provides for the preparation of a 0.001 mole quantity of the composition indicated. While each example is directed to the preparation of a single-phase garnet, it is well known that certain commercial applications do not require a material of such perfection. In fact, many commercial ferrimagnetic materials show the presence of more than one second phase. Accordingly, it is not intended that the invention be limited to the preparation of a single-phase material except insofar as some garnet phase is present. Under certain circumstances, such second-phase may be desirable for the purpose, for example, of diluting the magnetic properties in the material and, accordingly, may be deliberately added. In general, there are no materials which are necessarily to be avoided, either as contaminants or intentionally included ingredients. In fact, certain ingredients serving purposes already recognized in related YIG and substituted YIG systems may be included. Such ingredients include, for example, aluminum, gallium, scandium, tin, germanium, silicon, et cetera. Reduced moment is a desideratum in certain low frequency devices operating on the parametric principle. It is to be noted, too, that calcium, while preferred from the standpoint of atomic size, is merely a compensating ion permitting the introduction of vanadium into the structure. Any compensating ion in size and amount which may be accepted by the structure may be substituted.

Single crystals of the garnets described herein may be prepared by various known crystal growth techniques. For certain applications it is desirable to use single-crystal material which is also obviously within the scope of the invention.

Various other modifications and extensions of this invention will become apparent to those skilled in the art. All such variations and deviations which basically rely on the teachings through which this invention has advanced the art are properly considered within the spirit and scope of this invention.

What is claimed is:

1. A synthetic garnet composition having the formula:

$$\{Me_{3-A}Ca_A\}[Fe_{2-B}Sb_B](Fe_{3-C}V_C)O_{12}$$

where Me is selected from the group consisting of yttrium and bismuth, and A, B and C are related and limited according to:

$$B+C = \tfrac{1}{2}A$$
$$A = 0.1 \text{ to } 3$$
$$B = 0.05 \text{ to } 1.5 \text{ and}$$
$$C = \text{zero to } 1.5$$

2. The composition of claim 1 wherein A equals 3.
3. The composition of claim 1 wherein Me is bismuth.
4. The composition of claim 1 wherein B has a value of 0.5.
5. The composition of claim 1 wherein B has a value of 0.6.
6. The composition of claim 1 wherein B has a value of 0.7.
7. A method for preparing a garnet material having the formula:

$$\{Me_{3-A}Ca_A\}[Fe_{2-B}Sb_B](Fe_{3-C}V_C)O_{12}$$

where Me is selected from the group consisting of yttrium and bismuth, and A, B and C are related and limited according to:

$$B+C = \tfrac{1}{2}A$$
$$A = 0.3 \text{ to } 3$$
$$B = 0.1 \text{ to } 1.5 \text{ and}$$
$$C = \text{zero to } 1.5$$

which comprises mixing together the stoichiometric proportions of each cation and firing the mixture at a temperature in the range 1050° C. to 1350° C.

References Cited by the Examiner

UNITED STATES PATENTS

| | | | |
|---|---|---|---|
| 2,837,483 | 6/1958 | Hakker et al. | 252—62.5 |
| 3,003,966 | 10/1961 | Van Uitert | 252—62.5 |

TOBIAS E. LEVOW, *Primary Examiner.*

R. D. EDMONDS, *Assistant Examiner.*